US012771398B2

(12) United States Patent
Chen et al.

(10) Patent No.: US 12,771,398 B2
(45) Date of Patent: Oct. 20, 2026

(54) ELECTRONIC DEVICE AND METHOD FOR ESTIMATING SCATTERING PARAMETERS OF TWO-PORT NETWORK

(71) Applicant: MEDIATEK INC., Hsin-Chu (TW)

(72) Inventors: Kuo-Hao Chen, Hsinchu City (TW); Toru Matsuura, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 374 days.

(21) Appl. No.: 18/375,997

(22) Filed: Oct. 3, 2023

(65) Prior Publication Data

US 2025/0112665 A1 Apr. 3, 2025

(51) Int. Cl.
*H04B 1/44* (2006.01)
*H04B 17/14* (2015.01)

(52) U.S. Cl.
CPC ............... *H04B 1/44* (2013.01); *H04B 17/14* (2015.01)

(58) Field of Classification Search
None
See application file for complete search history.

(56) References Cited

U.S. PATENT DOCUMENTS

| | | | | |
|---|---|---|---|---|
| 9,594,147 B2 * | 3/2017 | Han | .................. | G01R 29/0878 |
| 12,074,648 B2 * | 8/2024 | Spits | ...................... | H04B 17/12 |

* cited by examiner

*Primary Examiner* — Akwasi M Sarpong
*Assistant Examiner* — Gabrielle N Dai
(74) *Attorney, Agent, or Firm* — Winston Hsu

(57) ABSTRACT

An electronic device and a method for estimating scattering parameters of a two-port network are provided. The electronic device includes a two-port network, a directional coupler, an input calibration kit placed in front of the two-port network, an output calibration kit placed behind the two-port network, and a control switch connected between the directional coupler and the two-port network. The directional coupler transmits a desired signal and receives a forward signal and a reverse signal from the two-port network. When the control switch is turned off, input calculation results are calculated according to the forward signal and the reverse signal by controlling the input calibration kit. When the control switch is turned on, output calculation results are calculated according to the forward signal and the reverse signal by controlling the output calibration kit. The scattering parameters are estimated according to the input calculation results and the output calculation results.

18 Claims, 4 Drawing Sheets

ELECTRONIC DEVICE AND METHOD FOR ESTIMATING SCATTERING PARAMETERS OF TWO-PORT NETWORK

BACKGROUND

The present invention is related to two-port networks, and more particularly to an electronic device and a method for estimating scattering parameters of a two-port network.

In order to estimate scattering parameters (S-parameters) of a two-port network for further S-parameter calibration, related arts typically require a vector network analyzer (VNA) to directly probe the two-port network. However, utilizing the VNA to obtain information of the S-parameters during a mass production flow of electronic devices is time consuming for device testing. Thus, there is a need for a novel architecture and an associated method, to allow an electronic device, which comprises a two-port network to be calibrated, to be able to estimate S-parameters of the two-port network with aid of built-in circuits without using the VNA.

SUMMARY

An objective of the present invention is to provide an electronic device and a method for estimating scattering parameters (S-parameters) of a two-port network, in order to estimate and calibrate the S-parameters without using the VNA.

At least one embodiment of the present invention provides an electronic device. The electronic device comprises a two-port network, a directional coupler, an input calibration kit, an output calibration kit and a control switch, wherein the input calibration kit is connected to an output port of the directional coupler, the output calibration kit is connected to an output port of the two-port network, and the control switch is connected between the output port of the directional coupler and an input port of the two-port network. The two-port network has at least one state corresponding to at least one set of S-parameters. The directional coupler is configured to transmit a desired signal to the two-port network and receive a forward signal and a reverse signal corresponding to the desired signal from the two-port network. For example, the directional coupler is a 4-port component configured to transmit the desired signal at an output port thereof, and receive the forward signal at a coupled port thereof and a reverse signal at an isolated port thereof, respectively. The input calibration kit is configured to provide a switchable input impedance. The output calibration kit is configured to provide a switchable output impedance. During a first phase, the control switch is turned off, multiple input calculation results are calculated according to the forward signal and the reverse signal by setting the input switchable impedance to be multiple input impedances, respectively. During a second phase, the control switch is turned on, multiple output calculation results are calculated according to the forward signal and the reverse signal by setting the output switchable impedance to be multiple output impedances, respectively. In addition, the at least one set of S-parameters is estimated according to the multiple input calculation results and the multiple output calculation results.

At least one embodiment of the present invention provides a method for estimating S-parameters of a two-port network. The method comprises: configuring a two-port network to have at least one state corresponding to at least one set of S-parameters; utilizing a directional coupler to transmit a desired signal to the two-port network and receive a forward signal and a reverse signal corresponding to the desired signal from the two-port network, wherein an input calibration kit is connected to an output port of the directional coupler, an output calibration kit is connected to an output port of the two-port network, and a control switch is connected between the output port of the directional coupler and an input port of the two-port network; during a first phase, turning off the control switch, and calculating multiple input calculation results according to the forward signal and the reverse signal by setting the input calibration kit to have multiple input impedances, respectively; during a second phase, turning on the control switch, and calculating multiple output calculation results according to the forward signal and the reverse signal by setting the output calibration kit to have multiple output impedances, respectively; and estimating the at least one set of S-parameters according to the multiple input calculation results and the multiple output calculation results.

The electronic device and the method provided by the embodiments of the present invention can utilize a calibration kit (e.g. the input calibration kit and the output calibration kit) to provide different input impedances, and accordingly derive related information of the S-parameters by measuring different results of a relationship between the forward signal and the reverse signal. Thus, the S-parameters can be derived with aid of built-in circuit, which is preferred for the mass production in comparison with using a vector network analyzer (VNA).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
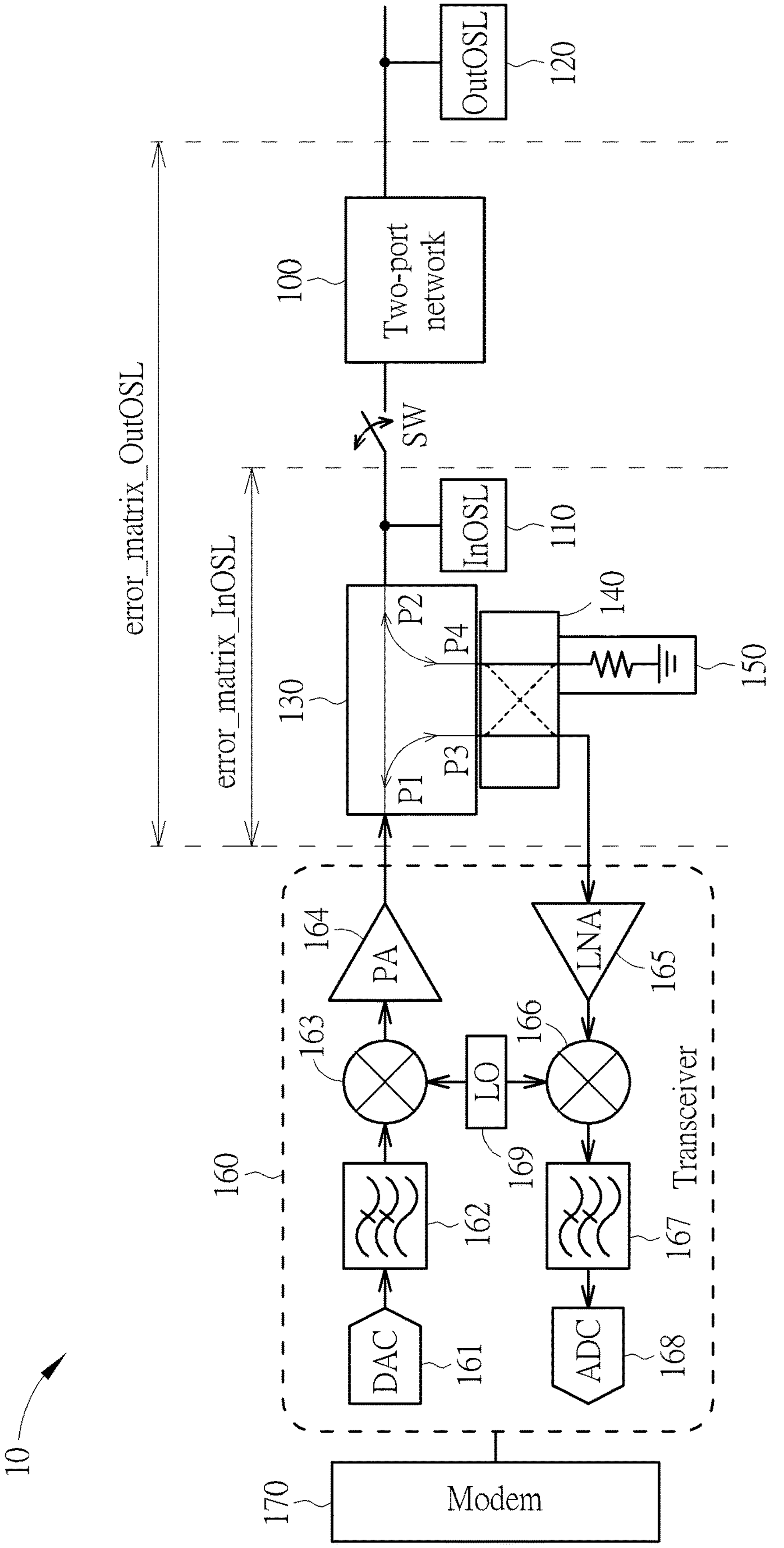
FIG. 1 is a diagram illustrating an electronic device according to an embodiment of the present invention.

FIG. 1 is a diagram illustrating an electronic device 10 according to an embodiment of the present invention. As shown in FIG. 1, the electronic device may comprise a two-port network 100 (e.g. an antenna tuner), an input calibration kit such as an input open-short-load (OSL) kit 110 (labeled "InOSL" in figures for brevity), an output calibration kit such as an output OSL kit 120 (labeled "OutOSL"), a directional coupler 130, a switch circuit such as a double pole double throw (DPDT) switch 140, a 50-ohm terminator 150, a transceiver 160, a processing circuit such as a modulator-demodulator (modem) 170, and a control switch SW. The input OSL kit 110 is connected to an output port P2 of the directional coupler 130, and the output OSL kit is connected to an output port of the two-port network 100 (e.g. a left-side port thereof shown in FIG. 1), where the control switch SW is connected between the output port P2 of the directional coupler 130 and an input port of the two-port network 100 (e.g. a right-side port thereof shown in FIG. 1). The transceiver 160 is connected between the modem 170 and the directional coupler 130. In detail, the transceiver 160 may comprise a digital-to-analog converter (DAC) 161, a filter 162, a mixer 163, a power amplifier 164, a low noise amplifier (LNA) 165, a mixer 166, a filter 167, an analog-to-digital converter (ADC) 168 and a local oscillator (LO) 169, where a signal path formed by the DAC 161, the filter 162, the mixer 163 and the power amplifier 164 may be regarded as a transmitting (TX) path, and a signal path formed by the LNA 165, the mixer 166, the filter 167 and the ADC 168 may be regarded as a receiving (RX) path. The DPDT switch 140 is connected to the directional coupler 130 and the transceiver 160 (more particularly, connected to the RX path of the transceiver 160).

In this embodiment, the two-port network 100 may have N states, where the N states may represent a certain configuration of the two-port network, and more particularly, the N states of the two-port network 100 may correspond to N sets of scattering parameters (S-parameters) of the two-port network 100, respectively, where N is a positive integer (e.g. a positive integer greater than one). The directional coupler is configured to control signal transmission of a desired signal, a forward signal and a reverse signal, wherein both the forward signal and the reverse signal correspond to the desired signal. For example, the directional coupler 130 may be a 4-port component configured to transmit the desired signal at the output port P2 thereof, and receive the forward signal at the coupled port P3 thereof and the reverse signal at an isolated port P4 thereof, respectively. In detail, the directional coupler 130 transmits the desired signal to the two-port network 100 (e.g. from an input port P1 to the output port P2 of the coupler 130) and receive the forward signal at the coupled port P3 thereof (e.g. by coupling the input port P1 thereof to the coupled port P3 and P4 is connected to the 50-ohm terminator 150) and the reverse signal at the isolated port P4 thereof (e.g. by coupling the output port P2 thereof to the isolated port P4 and P3 is connected to the 50-ohm terminator 150) from the two-port network 100. The input OSL 110 is configured to provide a switchable input impedance, and the output OSL 120 is configured to provide a switchable output impedance.

The two-port network 100 may be configured to have at least one state of the N states. During a first phase such as an input OSL calibration phase, the control switch SW is turned off (i.e. the directional coupler 130 and the two-port network 100 are disconnected), multiple input calculation results are calculated according to the forward signal and the reverse signal by setting the input switchable impedance to be multiple input impedances, respectively. During a second phase such as an output OSL calibration phase, the control switch SW is turned on (i.e. the directional coupler 130 and the two-port network 100 are connected), multiple output calculation results are calculated according to the forward signal and the reverse signal by setting the output switchable impedance to be multiple output impedances, respectively. In detail, as the control switch SW is turned off during the input OSL calibration phase, the forward signal and the reverse signal are generated and measured based on an input OSL error matrix error_matrix_InOSL, thereby obtaining the multiple input calculation results corresponding to the input OSL error matrix error_matrix_InOSL. As the control switch SW is turned on during the output OSL calibration phase, the forward signal and the reverse signal are generated and measured based on an output OSL error matrix error_matrix_OutOSL, thereby obtaining the multiple output calculation results corresponding to the output OSL error matrix error_matrix_OutOSL. As a result, at least one set of S-parameters corresponding to the aforementioned at least one state among the N sets of S-parameters can be estimated according to the multiple input calculation results and the multiple output calculation results. Deduced by analogy, each of the other sets of S-parameters can be estimated by configuring the two-port network 100 to have the other states among the N states. After the N sets of S-parameters respectively corresponding to the N states are derived, one of the N states which corresponds to an optimized set of S-parameters among the N sets of S-parameters can be selected to be a calibrated state of the two-port network 100.

In this embodiment, the modem 170 is configured to generate the multiple input calculation results and the multiple output calculation results according to the forward signal and the reverse signal, where the TX path of the transceiver 160 may transmit the desired signal to the directional coupler 130, and the RX path of the transceiver 160 may receive the forward signal from the coupled port P3 of the directional coupler 130 and the reverse signal from the isolated port P4 of the directional coupler 130, respectively, to allow the modem 170 to receive the forward signal and the reverse signal via the transceiver 160. In detail, the DPDT switch 140 is configured to selectively connect the coupled port P3 of the directional coupler 130 to the RX path of the transceiver 160 or connect the isolated port P4 of the directional coupler 130 to the RX path of the transceiver 160. Thus, the transceiver 160 may receive the forward signal for the modem 170 when the DPDT switch 140 connects the coupled port to the RX path of the transceiver 160, and the transceiver 160 may receive the reverse signal for the modem 170 when the DPDT switch 140 connects the isolated port to the RX path of the transceiver 160.

Figure 2:
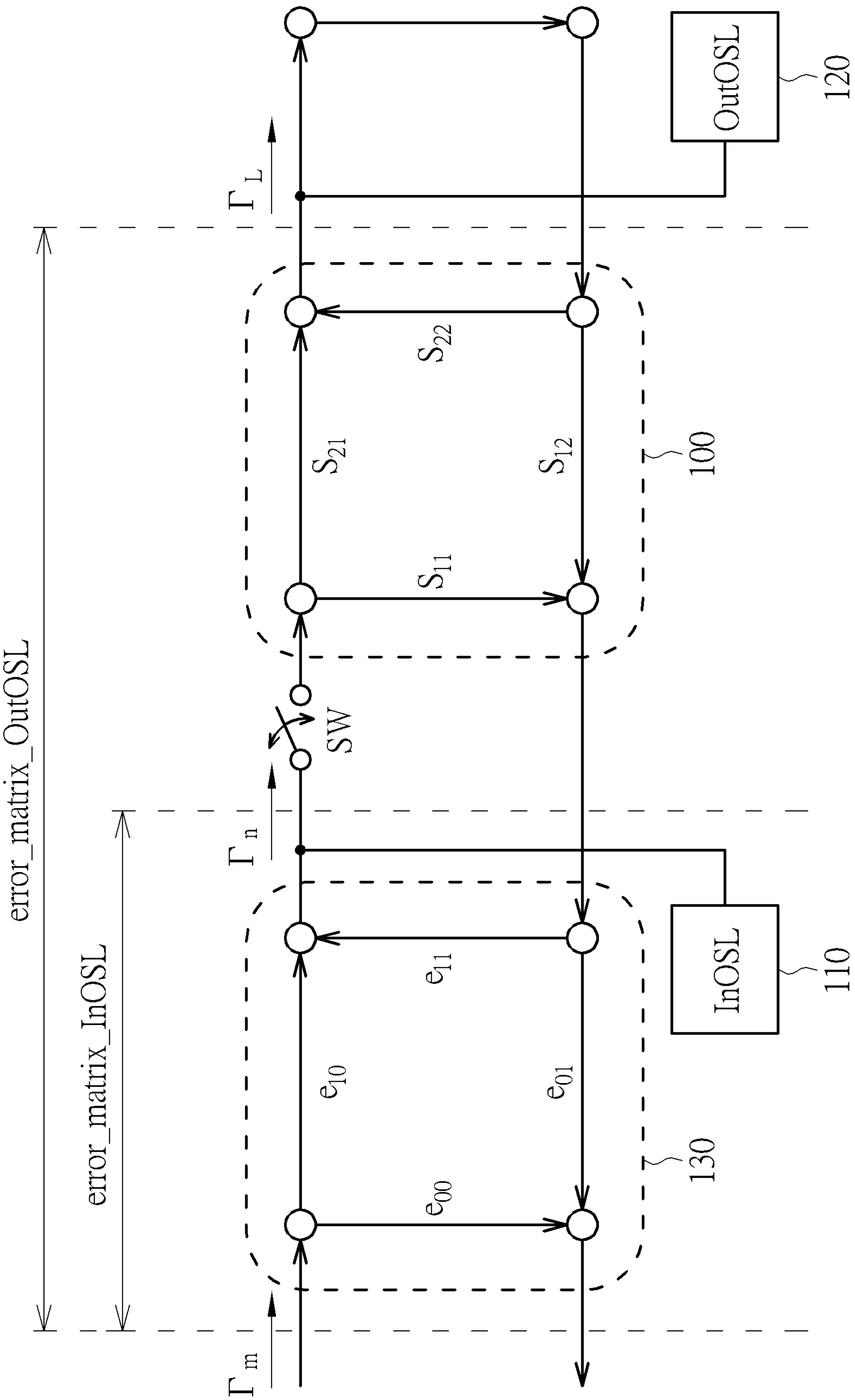
FIG. 2 is a diagram illustrating a mathematical model for deriving scattering parameters of a two-port network according to an embodiment of the present invention.

FIG. 2 is a diagram illustrating a mathematical model for deriving S-parameters of the two-port network 100 according to an embodiment of the present invention, where S-parameters of the directional coupler 130 may be expressed by $\{e_{00}, e_{10}, e_{01}, e_{11}\}$, and S-parameters of the two-port network 100 may be expressed by $\{S_{11}, S_{21}, S_{12}, S_{22}\}$. In this embodiment, a reflection coefficient on the input port P1 of the directional coupler 130 may be represented by $\Gamma_m$ (which can be calculated according to the forward signal and the reverse signal), a reflection coefficient on the output port P2 of the directional coupler 130 may be represented by $\Gamma_n$ (which can be controlled by the input OSL kit 110 when the control switch SW is turned off during the input OSL calibration phase), and an impedance on the output port of the two-port network 100 may be represented by $\Gamma_L$ (which can be controlled by the output OSL kit 120 when the control switch SW is turned on during the output OSL calibration phase).

During the input OSL calibration phase, the control switch SW is turned off, and multiple results of the reflection coefficient $\Gamma_m$ can be derived by measuring the forward signal and the reverse signal under conditions of different values of the input switchable impedance of the input OSL kit 110. For example, the reflection coefficient $\Gamma_m$ may be $\Gamma_{m1}$ when the input switchable impedance of the input OSL kit 110 is set to be $\Gamma_{a1}$, the reflection coefficient $\Gamma_m$ may be $\Gamma_{m2}$ when the input switchable impedance of the input OSL kit 110 is set to be $\Gamma_{a2}$, and the reflection coefficient $\Gamma_m$ may be $\Gamma_{m3}$ when the input switchable impedance of the input OSL kit 110 is set to be $\Gamma_{a3}$, where the reflection coefficients $\Gamma_{m1}$, $\Gamma_{m2}$ and $\Gamma_{m3}$ derived during the input OSL calibration phase may be examples of the multiple input calculation results, and an equation related to the above parameters may be derived according to the input OSL error matrix error_matrix_InOSL as follows:

$$\begin{bmatrix} \text{x\_inosl} \\ \text{y\_inosl} \\ \text{z\_inosl} \end{bmatrix} = \begin{bmatrix} \Gamma_{a1} & 1 & -\Gamma_{a1}\Gamma_{m1} \\ \Gamma_{a2} & 1 & -\Gamma_{a2}\Gamma_{m2} \\ \Gamma_{a3} & 1 & -\Gamma_{a3}\Gamma_{m3} \end{bmatrix}^{-1} \begin{bmatrix} \Gamma_{m1} \\ \Gamma_{m2} \\ \Gamma_{m3} \end{bmatrix},$$

$$\text{where } \begin{bmatrix} \text{x\_inosl} \\ \text{y\_inosl} \\ \text{z\_inosl} \end{bmatrix} = \begin{bmatrix} e_{10}e_{01} - e_{00}e_{11} \\ e_{00} \\ -e_{11} \end{bmatrix}$$

In this embodiment, the impedances $\Gamma_{a1}$, $\Gamma_{a2}$, $\Gamma_{a3}$ are different from one another. More particularly, it is preferred to make the impedances $\Gamma_{a1}$, $\Gamma_{a2}$ and $\Gamma_{a3}$ be as much far as possible in Smith Chart. For example, the input OSL kit 110 may be configured as an open circuit, a short circuit and a predetermined load (e.g. 50-ohm load), respectively, making $\Gamma_{a1}=1$ (the open circuit), $\Gamma_{a2}=-1$ (the short circuit) and $\Gamma_{a3}=0$ (the predetermined load). Thus, the S-parameters $e_{00}$ and $e_{11}$ and a product of the S-parameters $e_{10}$ and $e_{01}$ can be derived, which may be examples of the multiple input calculation results.

During the output OSL calibration phase, the control switch SW is turned on, and multiple results of the reflection coefficient $\Gamma_m$ can be derived by measuring the forward signal and the reverse signal under conditions of different values of the output switchable impedance of the output OSL kit 120. For example, the reflection coefficient $\Gamma_m$ may be $\Gamma_{m1}$ when the output switchable impedance of the output OSL kit 120 is set to be $\Gamma_{a1}$, the reflection coefficient $\Gamma_m$ may be $\Gamma_{m2}$ when the output switchable impedance of the output OSL kit 120 is set to be $\Gamma_{a2}$, and the reflection coefficient $\Gamma_m$ may be $\Gamma_{m3}$ when the output switchable impedance of the output OSL kit 120 is set to be $\Gamma_{a3}$, where the reflection coefficients $\Gamma_{m1}$, $\Gamma_{m2}$ and $\Gamma_{m3}$ derived during the output OSL calibration phase may be examples of the multiple output calculation results. In addition, a formula related to an input reflection coefficient such as $\Gamma_m$ on the input port P1 of the directional coupler 130 and an output reflection coefficient such as $\Gamma_n$ on the output port P2 of the directional coupler 130 may be derived based on the multiple input calculation results (e.g. the S-parameters $e_{00}$ and $e_{11}$ and a product of the S-parameters $e_{10}$ and $e_{01}$) as follows:

$$\Gamma_m = e_{00} + \frac{e_{01}e_{10}\Gamma_{n1}}{1 - e_{11}\Gamma_{n1}}$$

$$\Gamma_n = \frac{\Gamma_m - e_{00}}{e_{01}e_{10} - e_{11}e_{00} + e_{11}\Gamma_m}$$

Thus, multiple results of the reflection coefficient $\Gamma_n$ under the conditions of the different values of the output switchable impedance of the output OSL kit 120 can be derived according to the reflection coefficients $\Gamma_{m1}$, $\Gamma_{m2}$ and $\Gamma_{m3}$, respectively, as shown by the following equations:

$$\Gamma_{n1} = \frac{\Gamma_{m1} - e_{00}}{e_{01}e_{10} - e_{11}e_{00} + e_{11}\Gamma_{m1}}$$

$$\Gamma_{n2} = \frac{\Gamma_{m2} - e_{00}}{e_{01}e_{10} - e_{11}e_{00} + e_{11}\Gamma_{m2}}$$

$$\Gamma_{n3} = \frac{\Gamma_{m3} - e_{00}}{e_{01}e_{10} - e_{11}e_{00} + e_{11}\Gamma_{m3}}$$

In this embodiment, the reflection coefficients $\Gamma_{n1}$, $\Gamma_{n2}$ and $\Gamma_{n3}$ derived during the output OSL calibration phase may be examples of the multiple output calculation results. In addition, the output switchable impedance of the output OSL kit 120 may be set to be $\Gamma_{a1}$, $\Gamma_{a2}$, $\Gamma_{a3}$ in order to derive the reflection coefficients $\Gamma_{m1}$, $\Gamma_{m2}$ and $\Gamma_{m3}$, respectively, and an equation related to the above parameters may be derived according to the output OSL error matrix error_matrix_OutOSL as follows:

$$\begin{bmatrix} \text{x\_outosl} \\ \text{y\_outosl} \\ \text{z\_outosl} \end{bmatrix} = \begin{bmatrix} \Gamma_{a1} & 1 & -\Gamma_{a1}\Gamma_{n1} \\ \Gamma_{a2} & 1 & -\Gamma_{a2}\Gamma_{n2} \\ \Gamma_{a3} & 1 & -\Gamma_{a3}\Gamma_{n3} \end{bmatrix}^{-1} \begin{bmatrix} \Gamma_{n1} \\ \Gamma_{n2} \\ \Gamma_{n3} \end{bmatrix}$$

In this embodiment, the impedances $\Gamma_{a1}$, $\Gamma_{a2}$, $\Gamma_{a3}$ of the output OSL kit 120 are different from one another, and more particularly, it is preferred to make the impedances $\Gamma_{a1}$, $\Gamma_{a2}$ and $\Gamma_{a3}$ be as much far as possible in Smith Chart. For example, the output OSL kit 120 may be configured as an open circuit, a short circuit and a predetermined load (e.g. 50-ohm load), respectively, making $\Gamma_{a1}=1$ (the open circuit), $\Gamma_{a2}=-1$ (the short circuit) and $\Gamma_{a3}=0$ (the predetermined load). As a result, the S-parameters $S_{11}$, $S_{21}$, $S_{12}$ and $S_{22}$ may be derived based on the formula (which describe the relationship of the reflection coefficient $\Gamma_m$ and the reflection coefficient $\Gamma_n$) and the multiple output calculation results (e.g. the reflection coefficients $\Gamma_{n1}$, $\Gamma_{n2}$ and $\Gamma_{n3}$). In detail, the S-parameter $S_{11}$=y_outosl, the S-parameter $S_{22}$=−z_outosl, and a product of the S-parameters $S_{12}$ and $S_{21}$ may be x_outosl−y_outosl×z_outosl. Assuming that the two-port network 100 is implemented with passive components, each of the S-parameters $S_{12}$ and $S_{21}$ may be $\sqrt{\text{x\_outosl} - \text{y\_outosl} \times \text{z\_outosl}}$.

Figure 3:
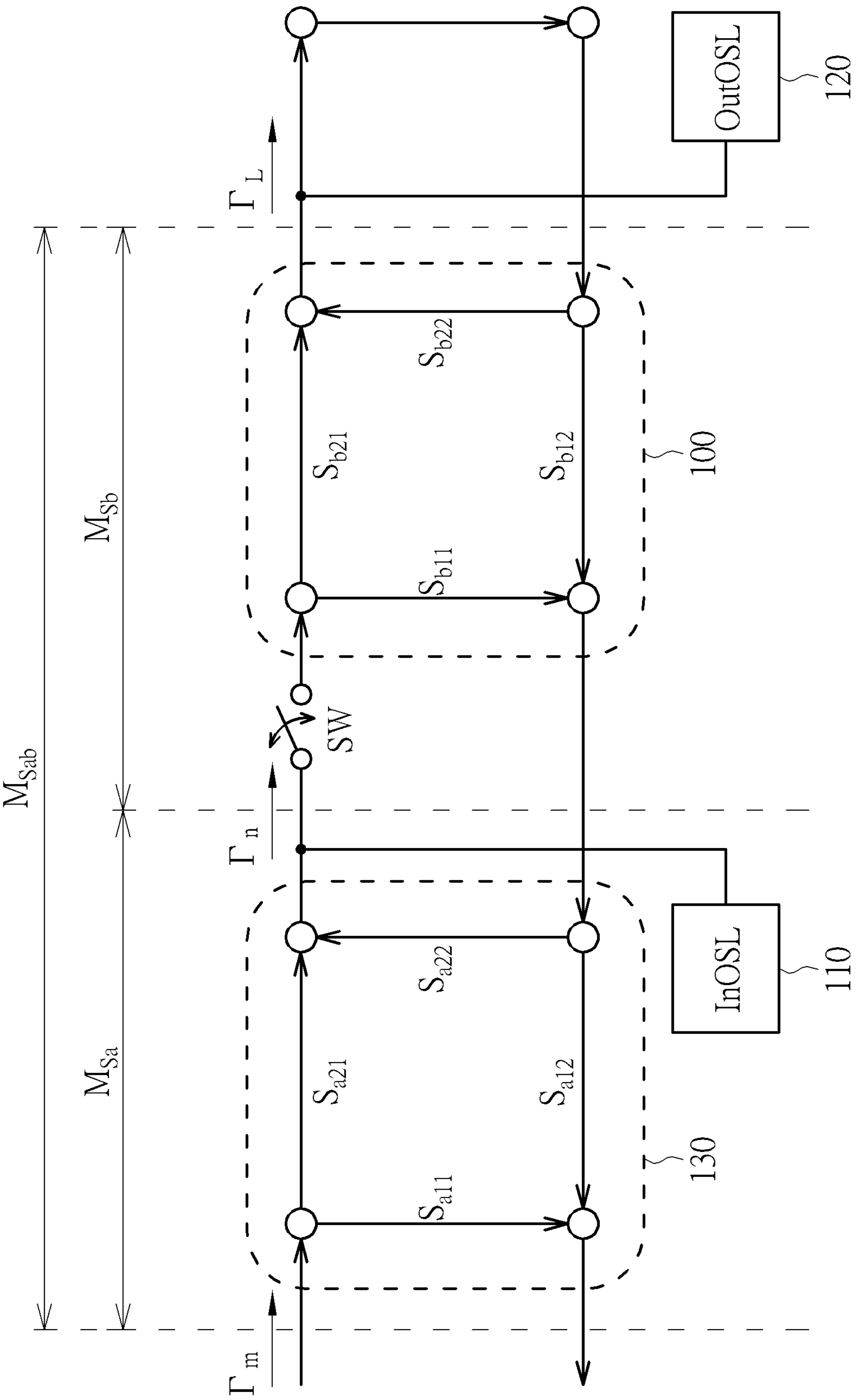
FIG. 3 is a diagram illustrating a mathematical model for deriving scattering parameters of a two-port network according to another embodiment of the present invention.

FIG. 3 is a diagram illustrating a mathematical model for deriving the S-parameters of the two-port network 100 according to another embodiment of the present invention. In this embodiment, S-parameters of the directional coupler 130 may be expressed as a scattering matrix (S-matrix) $M_{Sa}$ with elements $S_{a11}$, $S_{a12}$, $S_{a21}$ and $S_{a22}$ therein, the S-parameters of the two-port network 100 may be expressed as a S-matrix $M_{Sb}$ with elements $S_{b11}$, $S_{b12}$, $S_{b21}$ and $S_{b22}$ therein, and S-parameters of a cascaded network of the directional coupler 130 and the two-port network 100 (a two port network from the input port P1 of the directional coupler 130 to the output port of the two-port network 100) may be expressed as a S-matrix $M_{Sab}$ with elements $S_{ab11}$, $S_{ab12}$, $S_{ab21}$ and $S_{ab22}$ therein. According to a cascaded calculation of the matrix $M_{SA}$ and $M_{Sb}$, the matrix $M_{Sab}$ may be expressed as follows:

$$M_{Sa} = \begin{bmatrix} S_{a11} & S_{a12} \\ S_{a21} & S_{a22} \end{bmatrix}$$

$$M_{Sb} = \begin{bmatrix} S_{b11} & S_{b12} \\ S_{b21} & S_{b22} \end{bmatrix}$$

-continued $$M_{Sa}=\begin{bmatrix} S_{ab11} & S_{ab12} \\ S_{ab21} & S_{ab22} \end{bmatrix}=\begin{bmatrix} S_{a11}+\frac{S_{a12}S_{a21}S_{b11}}{1-S_{a22}S_{b11}} & \frac{S_{a12}S_{b12}}{1-S_{a22}S_{b11}} \\ \frac{S_{a21}S_{b21}}{1-S_{a22}S_{b11}} & S_{b22}+\frac{S_{b12}S_{b21}S_{a22}}{1-S_{a22}S_{b11}} \end{bmatrix}$$

During the input OSL calibration phase, multiple input calculation results of the reflection coefficient $\Gamma_m$ (e.g. the reflection coefficients $\Gamma_{m1}$, $\Gamma_{m2}$ and $\Gamma_{m3}$) can be derived by measuring the forward signal and the reverse signal under conditions of different values of the input switchable impedance of the input OSL kit 110 (e.g. by setting the input OSL kit 110 as the open circuit, the short circuit and the predetermined load, sequentially, as mentioned above), and parameters such as $S_{a11}$, $S_{a22}$ and $S_{ax}$ of the S-matrix $M_{Sa}$ may be derived based on the multiple input calculation results, where $S_{ax}=S_{a12}\times S_{a21}$. During the output OSL calibration phase, multiple output calculation results of the reflection coefficient $\Gamma_m$ (e.g. the reflection coefficients $\Gamma_{m1}$, $\Gamma_{m2}$ and $\Gamma_{m3}$) can be derived by measuring the forward signal and the reverse signal under conditions of different values of the output switchable impedance of the output OSL kit 120 (e.g. by setting the output OSL kit 120 as the open circuit, the short circuit and the predetermined load, sequentially, as mentioned above), and parameters such as $S_{ab11}$, $S_{ab22}$ and $S_{abx}$ of the S-matrix $M_{Sab}$ may be derived based on the multiple output calculation results, where $S_{abx}=S_{ab12}\times S_{ab21}$. Thus, the S-parameters of the two-port network (i.e. the elements $S_{b11}$, $S_{b12}$, $S_{b21}$ and $S_{b22}$ within the S-matrix $M_{Sb}$) can be derived based on the parameters $S_{a11}$, $S_{a22}$ and $S_{ax}$ of the S-matrix $M_{Sab}$ and the parameters $S_{ab11}$, $S_{ab22}$ and $S_{abx}$ of the S-matrix $M_{Sab}$ as follows:

$$S_{ab11}=S_{a11}+\frac{S_{ax}S_{b11}}{1-S_{a22}S_{b11}}\rightarrow S_{b11}=\frac{S_{ab11}-S_{a11}}{S_{ax}+S_{a22}(S_{ab11}-S_{a11})}$$

$$S_{abx}=\frac{S_{ax}S_{bx}}{(1-S_{a22}S_{b11})^2}\rightarrow S_{bx}=\frac{S_{abx}\times(1-S_{a22}S_{b11})^2}{S_{ax}}$$

$$S_{ab22}=S_{b22}+\frac{S_{bx}S_{a22}}{1-S_{a22}S_{b11}}\rightarrow S_{b22}=S_{ab22}-\frac{S_{bx}S_{a22}}{1-S_{a22}S_{b11}}$$

As the parameters $S_{a11}$, $S_{a22}$, $S_{ax}$, $S_{ab11}$, $S_{ab22}$ and $S_{abx}$ can be derived during the input OSL calibration phase or the output OSL calibration, the parameter $S_{b11}$ can be derived first. After the parameter $S_{b11}$ is derived, a parameter $S_{bx}$ can be derived, where $S_{bx}=S_{b12}\times S_{b21}$ (e.g. the parameter $S_{b12}$ may be equal to the parameter $S_{b21}$). After the parameters $S_{b11}$ and $S_{bx}$ are derived, the parameter $S_{b22}$ can be derived.

Figure 4:
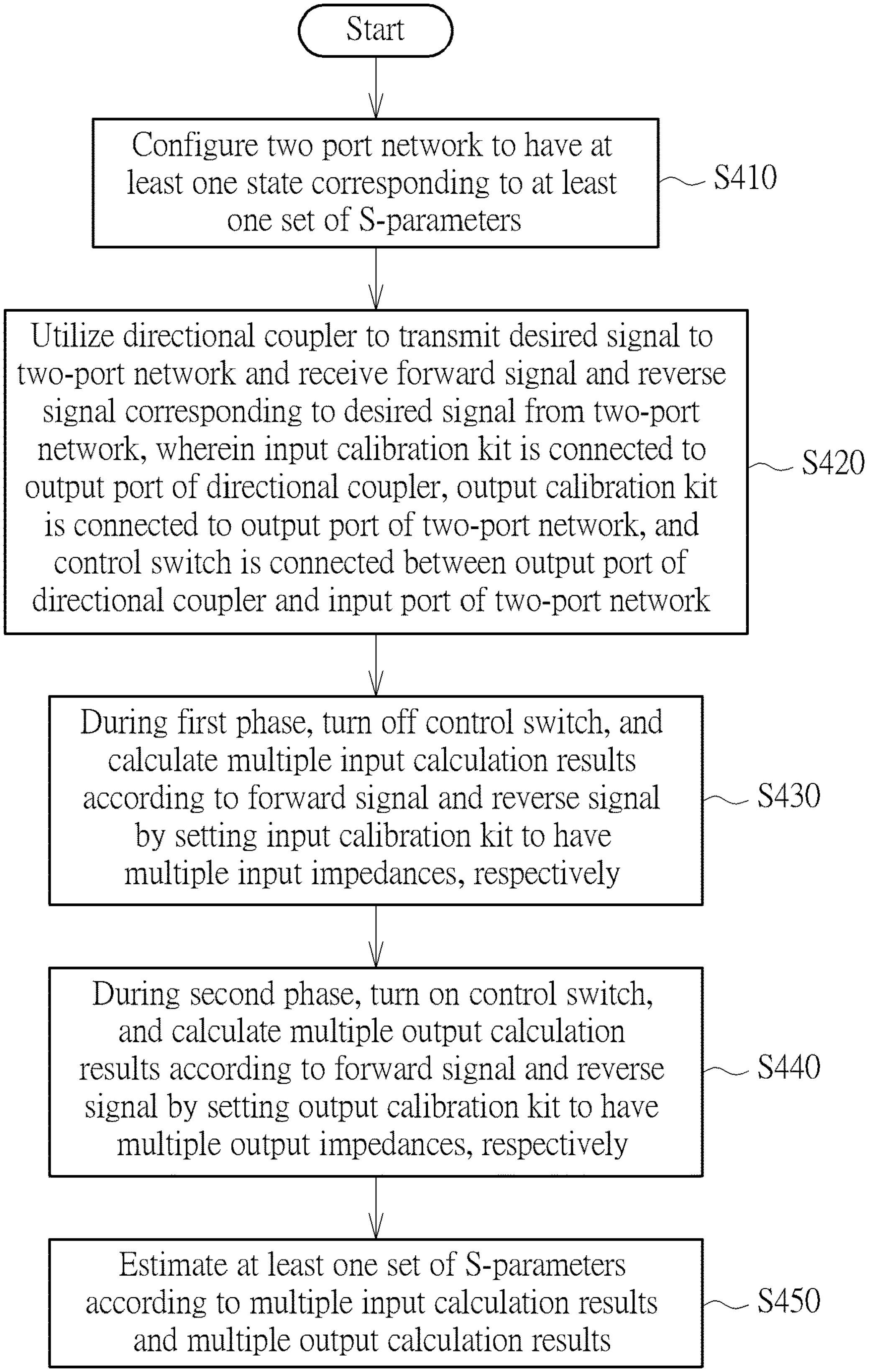
FIG. 4 is a diagram illustrating a working flow of a method for estimating S-parameters of a two-port network.

FIG. 4 is a diagram illustrating a working flow of a method for estimating S-parameters of a two-port network, where the method is applicable to an electronic device (e.g. the electronic device 10 shown in FIG. 1) comprising the two port network (e.g. the two-port network 100 shown in FIG. 1). It should be noted that the working flow shown in FIG. 4 is for illustrative purposes only, and is not meant to be a limitation of the present invention. For example, one or more steps may be added, deleted or modified in the working flow shown in FIG. 4. In addition, if a same result can be obtained, these steps do not have to be executed in the exact order shown in FIG. 4.

In Step S410, the electronic device may configure the two-port network therein to have at least one state corresponding to at least one set of S-parameters.

In Step S420, the electronic device may utilize a directional coupler therein to transmit a desired signal to the two-port network and receive a forward signal and a reverse signal corresponding to the desired signal from the two-port network, wherein an input calibration kit is connected to an output port of the directional coupler, an output calibration kit is connected to an output port of the two-port network, and a control switch is connected between the output port of the directional coupler and an input port of the two-port network.

In Step S430, during a first phase, the electronic device may turn off the control switch, and calculate multiple input calculation results according to the forward signal and the reverse signal by setting the input calibration kit to have multiple input impedances, respectively.

In Step S440, during a second phase, the electronic device may turn on the control switch, and calculate multiple output calculation results according to the forward signal and the reverse signal by setting the output calibration kit to have multiple output impedances, respectively.

In Step S450, the electronic device may estimate the at least one set of S-parameters according to the multiple input calculation results and the multiple output calculation results.

To summarize, the embodiment of the present invention can obtain six measurement results and associated equations by controlling the input OSL kit 110 placed in front of the two-port network 100 and the output OSL kit 120 placed behind the two-port network 100, in order to derive S-parameters of each state of the two-port network 100. After S-parameters of all states of the two-port network 100 are derived, the optimized set of S-parameters can be selected, thereby achieve a purpose of self-calibrating the S-parameters of the two-port network 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:

a two-port network, having at least one state corresponding to at least one set of scattering parameters (S-parameters);

a directional coupler, configured to transmit a desired signal to the two-port network and receive a forward signal and a reverse signal corresponding to the desired signal from the two-port network;

an input calibration kit, connected to an output port of the directional coupler, configured to provide a switchable input impedance;

an output calibration kit, connected to an output port of the two-port network, configured to provide a switchable output impedance; and a control switch, connected between the output port of the directional coupler and an input port of the two-port network;

wherein:

during a first phase, the control switch is turned off, multiple input calculation results are calculated according to the forward signal and the reverse signal by setting the input switchable impedance to be multiple input impedances, respectively, wherein the multiple input impedances are different from one another; and during a second phase, the control switch is turned on, multiple output calculation results are calculated according to the forward signal and the reverse signal by setting the output switchable impedance to be multiple output impedances, respectively;

wherein the at least one set of S-parameters is estimated according to the multiple input calculation results and the multiple output calculation results.

2. The electronic device of claim 1, wherein the multiple input impedances comprise a first input impedance, a second input impedance and a third input impedance, and the first input impedance, the second input impedance and the third input impedance are generated by configuring the input calibration kit as an open circuit, a short circuit and a predetermined load, respectively.

3. The electronic device of claim 1, wherein the multiple output impedances are different from one another.

4. The electronic device of claim 3, wherein the multiple output impedances comprise a first output impedance, a second output impedance and a third output impedance, and the first output impedance, the second output impedance and the output input impedance are generated by configuring the output calibration kit as an open circuit, a short circuit and a predetermined load, respectively.

5. The electronic device of claim 1, further comprising:

a processing circuit, configured to generate the multiple input calculation results and the multiple output calculation results according to the forward signal and the reverse signal; and a transceiver, connected between the processing circuit and the directional coupler, wherein a transmitting path of the transceiver transmits the desired signal to the directional coupler, and a receiving path of the transceiver receives the forward signal from a coupled port of the directional coupler and the reverse signal from an isolated port of the directional coupler, respectively, to allow the processing circuit to receive the forward signal and the reverse signal via the transceiver.

6. The electronic device of claim 5, further comprising:

a switch circuit, connected to the directional coupler and the transceiver, configured to selectively connect the coupled port of the directional coupler to the receiving path of the transceiver or connect the isolated port of the directional coupler to the receiving path of the transceiver.

7. The electronic device of claim 1, wherein a formula related to an input reflection coefficient on the input port of the directional coupler and an output reflection coefficient on the output port of the directional coupler is derived based on the multiple input calculation results, and the at least one set of S-parameters is derived based on the formula and the multiple output calculation results.

8. The electronic device of claim 1, wherein first scattering parameters (S-parameters) correspond to the directional coupler, second S-parameters correspond to a combination of the directional coupler and the two-port network, third set of S-parameters correspond to the two-port network, the first S-parameters are derived based on the multiple input calculation results, the second S-parameters are derived based on the multiple output calculation results, and the third S-parameters are derived based on the first S-parameters and the second S-parameters, wherein the third S-parameters are associated with the at least one set of S-parameters.

9. The electronic device of claim 1, wherein the at least one state of the two-port network comprises N states of the two-port network, the at least one set of S-parameters comprises N sets of S-parameters, wherein the two-port network is configured to have the N states in order to obtain the N sets of S-parameters respectively corresponding to the N states, and one of the N states which corresponds to an optimized set of S-parameters among the N sets of S-parameters is selected to be a calibrated state of the two-port network, wherein N is a positive integer greater than one.

10. A method for estimating scattering parameters (S-parameters) of a two-port network, comprising:

configuring a two-port network to have at least one state corresponding to at least one set of S-parameters;

utilizing a directional coupler to transmit a desired signal to the two-port network and receive a forward signal and a reverse signal corresponding to the desired signal from the two-port network, wherein an input calibration kit is connected an output port of the directional coupler, an output calibration kit is connected to an output port of the two-port network, and a control switch is connected between the output port of the directional coupler and an input port of the two-port network;

during a first phase, turning off the control switch, and calculating multiple input calculation results according to the forward signal and the reverse signal by setting the input calibration kit to have multiple input impedances, respectively, wherein the multiple input impedances are different from one another;

during a second phase, turning on the control switch, and calculating multiple output calculation results according to the forward signal and the reverse signal by setting the output calibration kit to have multiple output impedances, respectively; and estimating the at least one set of S-parameters according to the multiple input calculation results and the multiple output calculation results.

11. The method of claim 10, wherein the multiple input impedances comprise a first input impedance, a second input impedance and a third input impedance, and calculating multiple input calculation results according to the forward signal and the reverse signal by setting the input calibration kit to have multiple input impedances respectively comprises:

configuring the input calibration kit as an open circuit, a short circuit and a predetermined load, respectively.

12. The method of claim 10, wherein the multiple output impedances are different from one another.

13. The method of claim 12, wherein the multiple output impedances comprise a first output impedance, a second output impedance and a third output impedance, and calculating multiple output calculation results according to the forward signal and the reverse signal by setting the output calibration kit to have multiple output impedances respectively comprises:

configuring the output calibration kit as an open circuit, a short circuit and a predetermined load, respectively.

14. The method of claim 10, further comprising:

utilizing a transmitting path of a transceiver to transmits the desired signal to the directional coupler;

utilizing the directional coupler to receive the forward signal via a coupled port of the directional coupler and receive the reverse signal via an isolated port of the directional coupler to a receiving path of the transceiver; and utilizing the processing circuit to receive the forward signal and the reverse signal via the receiving path of the transceiver, to allow the processing circuit to generate the multiple input calculation results and the multiple output calculation results according to the forward signal and the reverse signal.

15. The method of claim 14, further comprising:

utilizing a switch circuit to selectively connect the coupled port of the directional coupler to the receiving path of the transceiver or connect the isolated port of the directional coupler to the receiving path of the transceiver.

16. The method of claim 10, wherein estimating the at least one set of S-parameters according to the multiple input calculation results and the multiple output calculation results comprises:

calculating a formula related to an input reflection coefficient on the input port of the directional coupler and an output reflection coefficient on the output port of the directional coupler based on the multiple input calculation results; and calculating the at least one set of S-parameters based on the formula and the multiple output calculation results.

17. The method of claim 10, wherein first scattering parameters (S-parameters) correspond to the directional coupler, second S-parameters correspond to a combination of the directional coupler and the two-port network, third S-parameters correspond to the two-port network, and estimating the at least one set of S-parameters according to the multiple input calculation results and the multiple output calculation results comprises:

calculating the first S-parameters based on the multiple input calculation results;

calculating the second S-parameters based on the multiple output calculation results; and calculating the third S-parameters based on the first S-parameters and the second S-parameters;

wherein the third S-parameters are associated with the at least one set of S-parameters.

18. The method of claim 10, wherein the at least one state of the two-port network comprises N states of the two-port network, the at least one set of S-parameters comprises N sets of S-parameters, and the method further comprises:

configuring the two-port network to have the N states in order to obtain the N sets of S-parameters respectively corresponding to the N states; and selecting one of the N states which corresponds to an optimized set of S-parameters among the N sets of S-parameters to be a calibrated state of the two-port network;

wherein N is a positive integer greater than one.

* * * * *